Dec. 2, 1952          G. CORNELIUS          2,620,206
PIPE COUPLER SEAL
Filed July 25, 1949
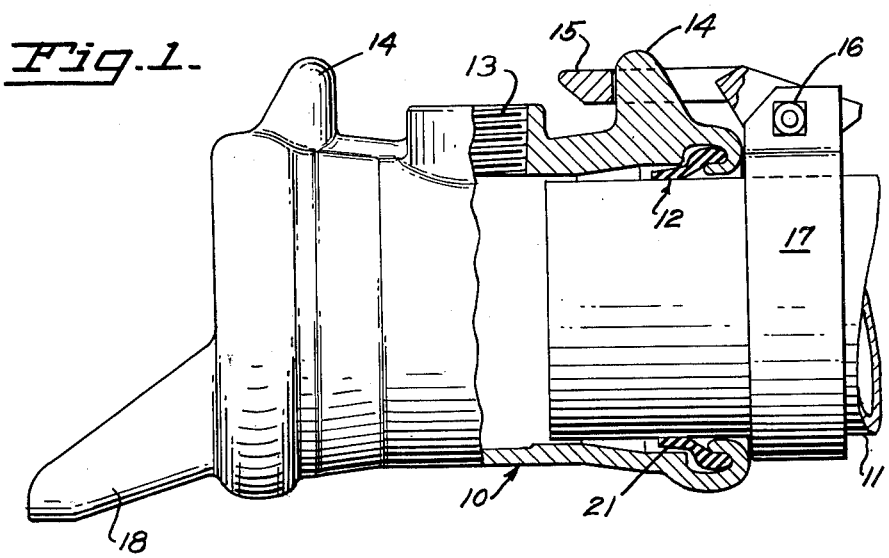
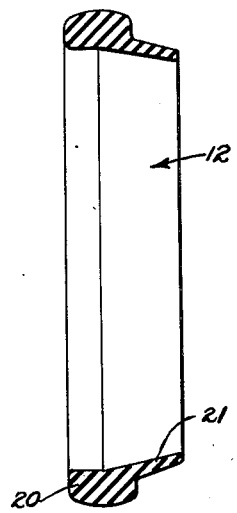
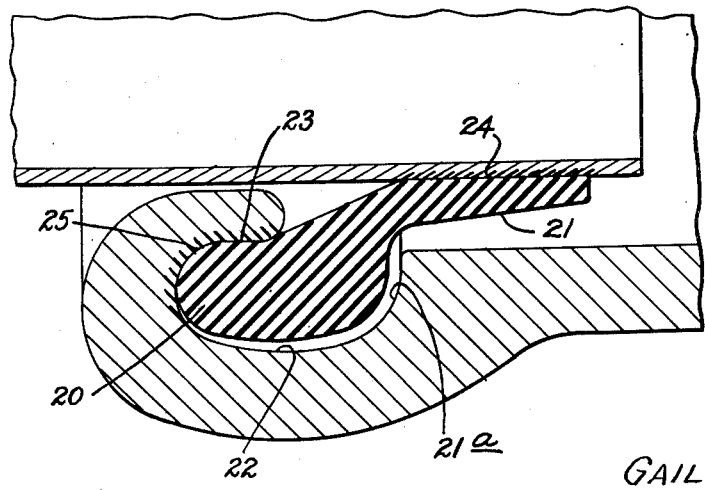
INVENTOR.
GAIL CORNELIUS
BY
Charles M. Fryer
ATTORNEY Patented Dec. 2, 1952

2,620,206

UNITED STATES PATENT OFFICE 2,620,206

PIPE COUPLER SEAL

Gail Cornelius, Portland, Oreg., assignor to R. M. Wade & Co., Portland, Oreg., a corporation of Oregon Application July 25, 1949, Serial No. 106,550

1 Claim. (Cl. 285—163)

This invention relates to pipe coupler seals and particularly to a seal including a gasket to be used between a pipe and a pipe coupling.

The invention is one of general application but has particular application to use in connection with irrigation piping and will be described herein in connection with such use for purposes of illustration. It is common practice to lay irrigation pipe over the surface of the ground and frequently to move it from place to place. It is desirable, therefore, to provide coupling means to enable the pipe sections to be easily and quickly attached and detached from the couplings which join them. The couplings must be fluid tight but are preferably sufficiently loose in their connection with the pipe to allow some flexibility so that the pipe may follow irregular terrain and gradual curves. All this is accomplished through the use of a pipe coupling with an inside diameter somewhat larger than the pipe itself and a flexible gasket interposed between the coupling and the pipe to form a seal with a pipe end thrust into the coupling.

Generally speaking, this manner of providing a seal is old but it is an object of the present invention to provide an improved pipe coupler seal that is inexpensive to manufacture and maintain and that provides a fluid tight seal in a novel manner. A further object of the invention is to provide such a seal wherein the gasket employed is held in the coupling by virtue of its shape and without the necessity of pressure or adhesives such as cement to retain it in place as the pipe is slipped into the coupling. A still further object of the invention is to provide a coupler seal and to retain it in a coupling in such a manner that thrusting a pipe end into the coupling will not dislodge or unduly wear the seal. A still further object of the invention is the provision of a pipe coupler seal wherein fluid pressure from within the coupling forms a seal between the gasket and the pipe and forms a seal between the gasket and the coupling both by pressure exerted in a radial inward direction. The elimination of thin, easily destroyed or feather edges on the gasket is also an object of this invention. Further objects and advantages of the invention and a full understand of its construction and arrangement are made apparent in the following specification by reference to the accompanying drawings wherein the pipe coupler seal of the present invention is illustrated in its application to irrigation piping.

In the drawings:

Fig. 1 is a central vertical sectional view with parts in full elevation of a pipe coupler and seal embodying the present invention.

Fig. 2 is a central sectional view through the seal shown in Fig. 1, and

Fig. 3 is an enlarged illustration of a part of the seal shown in Fig. 1 demonstrating the principles of sealing employed.

A coupling, generally indicated at 10 in Fig. 1, comprises a generally tubular casting into each end of which the end of a pipe, such as indicated at 11, may be inserted to provide for the continuous flow of water or other fluid through sections of pipe which form a pipe line. A gasket 12 is provided in each end of the coupling 10 to form a fluid tight seal between the coupling and the end of the pipe which extends into it.

The coupling 10 is shown as provided with a threaded outlet 13 for the connection of a sprinkler or branch pipe leading toward any suitable point of discharge. The coupling also has a pair of keepers 14 for cooperation with latches 15 pivotally secured adjacent the end of the pipe as by a bolt 16 which also serves to secure in place a split collar 17 embracing the pipe adjacent its end. The latch 15 and keeper 14 are conventionally designed to form a latching engagement automatically as the pipe end is inserted into the coupling. An apron 18 may also be provided on one or both ends of the coupling to provide a convenient approach for guiding the pipe end into the coupling.

The gasket 12, also shown in Fig. 2, is formed of rubber or other similar resilient material and the present invention includes the shape of this gasket and the manner in which it is retained in the coupling member 10. The gasket 12 has a thick annular portion 20 and a thinner inwardly tapered extension 21. The thicker portion 20 is received within and forms a seal with a groove which undercuts the entering edge of the coupling 10. This groove is formed by cutting radially outwardly from the inner surface of the coupling to provide an abutment shoulder 21a and an annular wall 22 substantially parallel to the longitudinal axis of the coupling. The cut is also continued toward the edge of the coupling so as to undercut the edge and produce a wall 23 also parallel to the longitudinal axis of the coupling but disposed radially inwardly of the large portion 20 of the gasket received within the groove. Due to the flexibility of the material from which the gasket is made, it is a simple matter to insert it into the coupling with its enlarged portion 20 received within the groove. Consequently, when the end of the pipe is thrust into the coupling, it is embraced by the inwardly tapered extension 21 of the gasket while the entering edge of the coupling and particularly the annular wall 23 thereof is also embraced by the thicker portion 20 of the gasket.

With the pipe thus assembled into the coupling, fluid pressure from within will be exerted against the outer peripheral surface of the gasket to force it inwardly at its tapered extension 21 against the pipe and to force it also inwardly at its enlarged portion 20 against the surface 23 of the coupling, the areas of pressure between the gasket and the pipe and coupling being indicated by heavy shading at 24 and 25 respectively in Fig. 3. In this manner, a perfect seal is made by inward pressure only; this being an advantage in that it reduces the stresses on the gasket which tend to deteriorate it particularly as compared with gaskets where both inward and outward pressure are necessary to accomplish the desired sealing effect.

One advantage of the construction shown is that the gasket is securely held in place and a perfect seal is formed without the necessity of cement or mechanical pressure. Due to the arrangement of the gasket in the coupling, the insertion of the pipe end does not tend to dislodge it from its retaining groove because of the fact that its enlarged portion will abut against the abrupt shoulder 21a of the groove and, as the pipe is passing through the thinner inward extension 21, it becomes impossible for the gasket to flex in a manner that will permit it to be removed from the retaining groove. Also, as the end of the pipe is thrust into the coupling, the fact that the gasket is retained in a groove which undercuts the entering edge of the coupling permits the pipe to ride on the metal portion of the coupling with very little tendency to engage and thrust the gasket inwardly in a manner to dislodge it. This also saves wear on the gasket because the frictional engagement of the pipe with the gasket is minimized.

Because the fluid under pressure within the coupling is free to flow behind or on the outside of the gasket, the necessity for a split gasket and feathered edges is eliminated and a gasket may be provided which is of sturdy and durable design yet sensitive to sealing pressure.

I claim:

A pipe coupler seal comprising a resilient gasket disposed within a coupling in a position to embrace a pipe end inserted thereinto in which the coupling is provided with a groove undercutting its entering edge to present an outwardly facing surface for contact by the gasket which surface is of annular shape and substantially parallel to the longitudinal axis of the coupling and to provide an abutment surface facing said undercut substantially normal to said axis, said gasket having an enlarged portion engaging said outwardly facing surface and spaced from the outer surface of said groove and a longitudinally extending annular lip to embrace said pipe end, said enlarged portion providing a shoulder adapted to engage said abutment surface to retain said gasket in said groove during insertion of said pipe end.

GAIL CORNELIUS.

REFERENCES CITED

The following references are of record in the file of this patent:

UNITED STATES PATENTS

| Number | Name | Date |
| --- | --- | --- |
| 1,818,985 | Burnish | Aug. 18, 1931 |
| 1,819,007 | Smith | Aug. 18, 1931 |
| 2,219,064 | Boyer et al. | Oct. 22, 1940 |
| 2,244,396 | Kellaher | June 3, 1941 |

FOREIGN PATENTS

| Number | Country | Date |
| --- | --- | --- |
| 294,282 | Great Britain | July 23, 1928 |